United States Patent
Kim et al.

(10) Patent No.: US 10,796,054 B2
(45) Date of Patent: Oct. 6, 2020

(54) CHIP DESIGN METHOD OF OPTIMIZING CIRCUIT PERFORMANCE ACCORDING TO CHANGE IN PVT OPERATION CONDITIONS

(71) Applicant: SAMSUNG ELECTRONICS CO., LTD., Suwon-si, Gyeonggi-do (KR)

(72) Inventors: Ji-youn Kim, Hwaseong-si (KR); Eun-ju Hwang, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/260,890

(22) Filed: Jan. 29, 2019

(65) Prior Publication Data

US 2019/0243938 A1   Aug. 8, 2019

(30) Foreign Application Priority Data

Feb. 2, 2018   (KR) .................. 10-2018-0013436
Aug. 6, 2018   (KR) .................. 10-2018-0091443

(51) Int. Cl.
| | | |
|---|---|---|
| *G06F 17/50* | (2006.01) | |
| *G06F 30/39* | (2020.01) | |
| *G06F 30/3312* | (2020.01) | |
| *G06F 119/12* | (2020.01) | |

(52) U.S. Cl.
CPC .......... *G06F 30/39* (2020.01); *G06F 30/3312* (2020.01); *G06F 2119/12* (2020.01)

(58) Field of Classification Search
CPC .. G06F 30/39; G06F 30/3312; G06F 2119/12; G06F 30/327; G06F 30/367; G06F 17/5031; G06F 17/5045

USPC ........................................................ 716/100
See application file for complete search history.

(56) References Cited

U.S. PATENT DOCUMENTS

| | | | |
|---|---|---|---|
| 6,634,015 B2 | 10/2003 | Lee et al. | |
| 7,117,466 B2 | 10/2006 | Kalafala et al. | |
| 7,181,711 B2 | 2/2007 | Foreman et al. | |
| 7,454,731 B2 * | 11/2008 | Oh ..................... | G06F 30/3312 716/113 |
| 7,480,881 B2 | 1/2009 | Tetelbaum et al. | |
| 8,225,257 B2 | 7/2012 | Tetelbaum | |
| 8,560,994 B1 | 10/2013 | Agrawal et al. | |

(Continued)

FOREIGN PATENT DOCUMENTS

| | | |
|---|---|---|
| JP | 2005-214732 | 8/2005 |
| JP | 2007-257342 | 10/2007 |
| JP | 4095753 | 6/2008 |

*Primary Examiner* — Jack Chiang
*Assistant Examiner* — Brandon Bowers
(74) *Attorney, Agent, or Firm* — F. Chau & Associates, LLC

(57) ABSTRACT

A method of designing a chip having an integrated circuit is provided. The method includes obtaining delta cell delays and delta net delays according to a process, voltage, and temperature (PVT) corner change with respect to a plurality of cells and a plurality of nets forming the integrated circuit; analyzing sensitivity with respect to a delay according to the PVT corner change of a plurality of paths in the integrated circuit, by using the delta cell delays and the delta net delays; determining N-number of sensitivity-critical paths among the plurality of paths based on a result of the analysis, wherein N is an integer greater than or equal to 0; and performing an engineering change order (ECO) based on a result of the determination.

14 Claims, 14 Drawing Sheets

(56) References Cited

U.S. PATENT DOCUMENTS

| | | | |
|---|---|---|---|
| 8,584,065 B2 | 11/2013 | Iyer et al. | |
| 8,615,727 B2 | 12/2013 | Ghanta et al. | |
| 9,602,083 B2 | 3/2017 | Bollapalli et al. | |
| 2002/0162086 A1* | 10/2002 | Morgan | G06F 30/30 716/102 |
| 2006/0026546 A1* | 2/2006 | Dinter | G06F 30/00 716/113 |
| 2007/0050745 A1* | 3/2007 | Dinter | G06F 30/3312 716/114 |
| 2007/0226671 A1 | 9/2007 | Hirata | |
| 2007/0234254 A1* | 10/2007 | Yoshimura | G06F 30/3312 716/114 |

* cited by examiner

FIG. 6

```
              S200
               │
               ▼
   ┌─────────────────────────────┐
   │  CALCULATE SLACK CHANGE AMOUNT │──S212
   └─────────────────────────────┘
               │
               ▼
   ┌─────────────────────────────┐
   │ DETERMINE SENSITIVITY-CRITICAL PATH │──S214
   │   BASED ON SLACK CHANGE AMOUNT     │
   └─────────────────────────────┘
               │
               ▼
              S220
```

FIG. 7

Table_a

| PATH | STATIC TIMING ANALYSIS(STA) | PATH SENSITIVITY ANALYSIS(PSA) |
|---|---|---|
| DATA_P1 | PASS | SCP |
| DATA_P2 | TCP | PASS |
| DATA_P3 | PASS | PASS |
| DATA_P4 | TCP | SCP |

Table_b

| CLOCK PATH | CLOCK LATENCY SENSITIVITY ANALYSIS | CLOCK SKEW SENSITIVITY ANALYSIS |
|---|---|---|
| CLK_P1 | L1 | S1 |
| CLK_P2 | L2 | S2 |
| CLK_P3 | L3 | S3 |
| CLK_P4 | L4 | S4 |

CHIP DESIGN METHOD OF OPTIMIZING CIRCUIT PERFORMANCE ACCORDING TO CHANGE IN PVT OPERATION CONDITIONS

CROSS-REFERENCE TO RELATED APPLICATIONS

This application claims the benefits of Korean Patent Application No. 10-2018-0013436, filed on Feb. 2, 2018, in the Korean Intellectual Property Office, and Korean Patent Application No. 10-2018-0091443, filed on Aug. 6, 2018, in the Korean Intellectual Property Office, the disclosures of which are incorporated herein in their entirety by reference.

BACKGROUND

The inventive concept relates to a chip design method, and more particularly, to a chip design method of optimizing circuit performance according to a change in process, voltage, and temperature (PVT) conditions.

High-performance circuits may be designed to operate in a wide PVT range due to a relative increase in the dispersion of microprocesses (process change), an operating voltage adjustment according to a usage scenario (voltage change), and diversifying operation environments (temperature change). As PVT operating conditions change, the delay characteristics or power characteristics of transistors and circuit interconnects are changed, and thus circuit performance varies greatly.

In order to ensure consistent operation in consideration of the characteristics of a circuit that change according to the PVT operating conditions, various PVT corners may be selected and the performance required for each PVT corner may be determined as a specification. A multi-corner sign-off flow may then be performed so that the circuit satisfies the corresponding specification in each PVT corner. In such a flow, the timing sign-off of each corner can be completed by showing that timing-critical paths found through a static timing analysis (STA) meet specifications.

Although the above-described method ensures circuit performance in each sign-off corner, it cannot guarantee that the circuit performance meets a target specification when the circuit is operated under conditions outside the sign-off corner.

SUMMARY

Embodiments of the inventive concept provide a chip design method which may provide for circuit operation that matches a target specification under various process, voltage, and temperature (PVT) operation.

According to an aspect of the inventive concept, there is provided a method of designing a chip having an integrated circuit, the method including obtaining delta cell delays and delta net delays according to a PVT corner change with respect to a plurality of cells and a plurality of nets forming the integrated circuit, analyzing sensitivity with respect to a delay according to the PVT corner change of a plurality of paths in the integrated circuit, by using the delta cell delays and the delta net delays, determining N-number of sensitivity critical paths among the plurality of paths based on a result of the analysis, wherein N is an integer greater than or equal to 0, and performing an engineering change order (ECO) based on a result of the determination.

According to another aspect of the inventive concept, there is provided a method of designing a chip having an integrated circuit by using design data corresponding to a plurality of PVT corners, the method including selecting a first PVT corner and a second PVT corner among the plurality of PVT corners, analyzing sensitivity with respect to a delay according to a PVT corner change from the first PVT corner to the second PVT corner of a plurality of paths in the integrated circuit, detecting, from among the plurality of paths, a path that is expected to violate a timing constraint at a third PVT corner other than the above PVT corners, based on a result of the analysis, and performing an engineering change order (ECO) based on a result of the detection.

According to another aspect of the inventive concept, there is provided a non-transitory processor-readable storage medium having stored thereon instructions capable of being executed by a processor for designing a chip having an integrated circuit, the processor being configured to obtain delta cell delays and delta net delays according to a process, voltage, and temperature (PVT) corner change with respect to a plurality of cells and a plurality of nets forming the integrated circuit, analyze sensitivity with respect to a delay according to the PVT corner change of a plurality of paths in the integrated circuit by using the delta cell delays and the delta net delays, determine N-number of sensitivity critical paths among the plurality of paths based on a result of the analysis, wherein N is an integer greater than or equal to 0, and perform an engineering change order (ECO) based on a result of the determination.

BRIEF DESCRIPTION OF THE DRAWINGS

Embodiments of the inventive concept will be more clearly understood from the following detailed description taken in conjunction with the accompanying drawings in which:

FIG. 6 is a flowchart for explaining in detail an operation S210 of FIG. 3 according to an embodiment of the present disclosure;

FIG. 7 is a table showing an example of a result obtained when a static timing analysis (STA) and the PSA are performed on a plurality of paths according to an embodiment of the present disclosure;

DETAILED DESCRIPTION OF THE EMBODIMENTS

Figure 1:
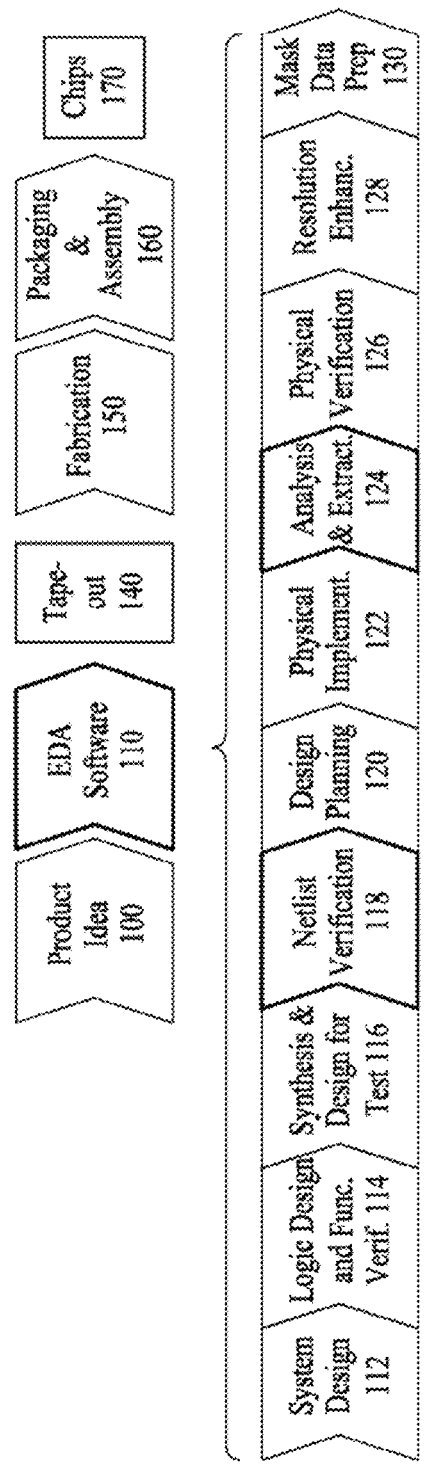
FIG. 1 illustrates an example of a digital design flow adopting a path sensitivity analysis (PSA), according to an embodiment of the present disclosure.

FIG. 1 illustrates an example of a digital design flow adopting a path sensitivity analysis (PSA), according to an embodiment of the present disclosure.

Referring to FIG. 1, at a high level, a process begins from a product idea (operation 100), and may be realized through an electronic design automation (EDA) software design process (operation 110). When a design is completed, the process may be taped out (operation 140). After the tape out, a fabrication process (operation 150) may be performed, followed by a packaging and assembly process (operation 160). As a result, a completed chip (operation 170) may be generated.

The EDA software design process (operation 110) may include a plurality of operations (operation 112 to operation 130). However, the operations illustrated in FIG. 1 (e.g., operation 112 to operation 130) may be merely exemplary embodiments. The present disclosure is not limited thereto, and new operations may be further added or certain operations may be omitted. In the following description, the EDA software design process (operation 110) is briefly described.

In a system design (operation 112), a designer may describe a function to be implemented, refine the function, and carry out a what-if plan to check costs. Hardware-software architecture division may also be performed in the present operation.

In a logic design and function verification (operation 114), very high speed integrated circuit (VHSIC) hardware description language (VHDL) or Verilog codes about modules in a system are recorded, and functional accuracy in a chip design may be checked. In detail, it may be checked whether the chip design generates a correct output.

In a synthesis and design for test (operation 116), the VHDL/Verilog codes may be converted to a netlist. The netlist may be optimized to be matched with a target technology. Furthermore, a plurality of tests that allow check of a completed chip may be designed and implemented.

In a netlist verification (operation 118), whether the netlist matches well timing constraints and VHDL/Verilog source codes may be tested. The PSA according to an embodiment may be applied to the operation 118.

In a design planning (operation 120), an overall floorplan of a chip may be configured and analyzed for the timing and top routing of the chip.

In a physical implement (operation 122), a layout (position determination of circuit elements) and routing (connection of circuit elements) may be performed.

In an analysis and extraction (operation 124), a circuit function may be verified at a transistor level. Furthermore, the PSA according to an embodiment may be applied to the operation 124.

In a physical verification (operation 126), various test functions may be performed to ensure accuracy of fabrication, and to check for electrical issues and lithography issues.

In a resolution enhancement (operation 128), a geometrical manipulation of the layout is performed, and thus manufacturability of the design may be enhanced.

In a mask data preparation (operation 130), "tape out" data for mask fabrication may be used for producing chips, such as integrated circuits produced by lithography.

In the netlist verification (operation 118) and the analysis and extraction (operation 124), along with the PSA, a static timing analysis (STA) may be used. The STA may provide the designer with the extremal scenario regarding the chip design. The extremal scenario may include, under various combined conditions of noise and variation, scenarios having the biggest problems among a case in which a design speed is affected by a slow data path delay of a timing path (setup-critical paths) and a case in which a correct result may not be captured because a data path delay is shorter than a clock skew of a tinting path (hold-critical paths). In detail, the STA may define device performance (for example, a setup check to determine a maximum clock speed with respect to the chip design) and a chip defect (for example, a hold check to identify a certain race condition) in each of preset multi-PVT (process, voltage, and temperature) corners.

By correcting the chip design based on a result of the STA, the chip fabricated by the design flow of FIG. 1 may operate normally at preset multi-PVT corners. However, as the range of PVT conditions under which the chip normally operates may be wide, the preset PVT corners in the operation 118 and the operation 124 may not match the PVT conditions under which the chip actually operates. However, the PSA may be performed such that the chip may operate normally under a wide range of PVT conditions. In other words, the PSA may analyze a delay change amount of paths in the chip design at each of the multi-PVT corners in various ways, and detect paths that become bottlenecks when the chip operates under a PVT condition outside of the PVT corners.

As a result of the correction of the chip design based on the result of the PSA, the chip fabricated by the design flow of FIG. 1 may operate normally under a wide range of PVT conditions. Thus, a chip design and manufacturing system may perform an STA on a design of a chip based on a plurality of preset PVT conditions. The system may then identify at least one sensitivity critical path (SCP) of the chip based on a PS), when the at PSA indicates that the at least one SCP violates a design rule under a PVT condition other than the plurality of preset PVT conditions. The system may then modify the design based at least in part on the STA and the SCP such that the chip is configured to operate normally under the PVT condition based on the modified design. Finally, the system may fabricate the chip based on the modified design.

The PSA, according to an embodiment, may be performed parallel to the STA, or before or after the STA. The PSA may be performed by using the result of the STA, or the result of the PSA may be used for the performance of the STA. The PSA and the STA may be complementarily and variously performed, and a detailed embodiment thereof is described with reference to FIGS. 8A to 8C.

Figure 2A:
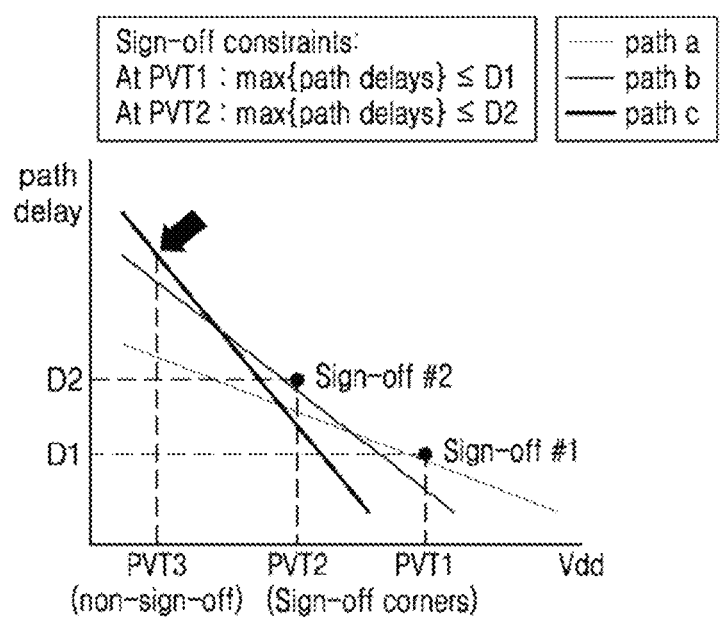
FIGS. 2A to 2C are graphs for explaining effectiveness of the PSA according to an embodiment of the present disclosure.
Figure 2B:
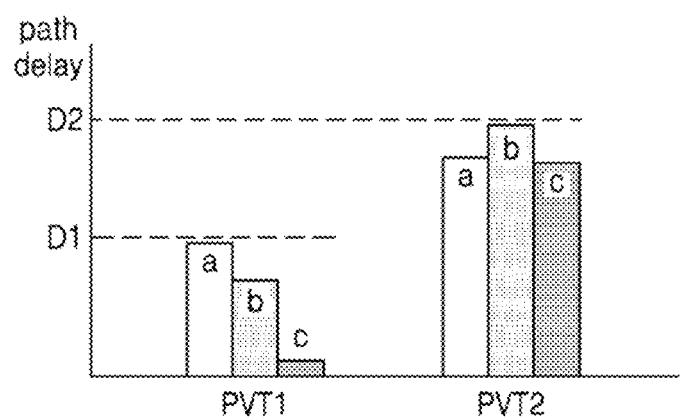
Figure 2C:
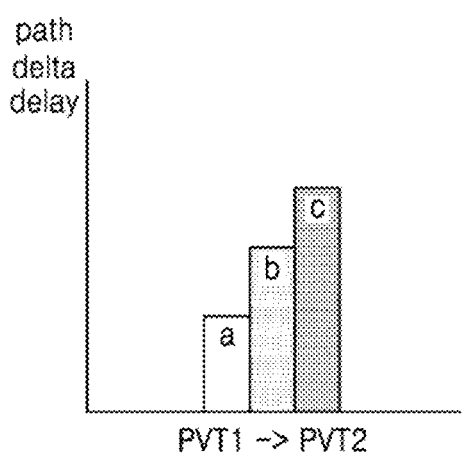

FIGS. 2A to 2C are graphs for explaining effectiveness of the PSA according to an embodiment of the present disclosure.

FIG. 2A is a graph showing a relationship between a sign-off specification according to different PVT corners (PVT1-PVT3) and a changed in the delay of paths (path a to path c) in a circuit of a chip design. In the following description, a PVT condition is described assuming that a voltage applied to the chip is dropped. As the PVT condition under which the chip operates is changed from a first PVT corner PVT1 to a second PVT corner PVT2, a delay of the paths (path a to path c) tends to increase. The other PVT corners (i.e., including PVT1 and PVT2, but excluding a third PVT corner PVT3) may be preset PVT corners to allow the STA to be performed in the operation 118 and the operation 124 of FIG. 1. In other words, the first PVT corner PVT1 and the second PVT corner PVT2 may be referred to as the sign-off corners, and the third PVT corner PVT3 may be referred to as the non-sign-cuff corner.

A first path (path a) having the greatest delay at the first PVT corner PVT1 may be determined to be a critical path at the first PVT corner PVT1. Furthermore, a second path (path b) having the greatest delay at the second PVT corner PVT2 may be determined to be a critical path at the second PVT corner PVT2. The delay of the first path (path a) at the first PVT corner PVT1 may be equal to or less than a value "D1" that is equal to or less than a sign-off constraint specification, and a delay of the second path (path h) at the second PVT corner PVT2 may be less than or equal to a value "D2" that is equal to or less than a sign-off constraint specification. Accordingly, the chip design may be identified to be suitable in terms of the STA.

However, the third path (path c) having the greatest delay at the third PVT corner PVT3 may correspond to a sensitivity critical path as a path that is not detected through the STA. The sensitivity critical path may be defined to be a path that is expected to violate a design rule (for example, a hold violation and/or a setup violation) under a certain PVT condition (for example, the third PVT corner) because a delay is abruptly increased according to the PVT corner change.

As the sensitivity critical path (path c) becomes critical under a PVT condition other than the sign-off corners (for example, an abrupt increase of delay), performance of the chip (or a circuit in the chip) may deteriorate. Also, as the sensitivity critical path (path c) makes a change trend irregular when delays of a plurality of paths under a wide range of PVT conditions are changed, the optimization efficacy of design timing, power and the like may deteriorate.

Referring to FIG. 2B, the sensitivity critical path may not be easily identified with a result of the STA independently performed at each of the sign-off corners PVT1 and PVT2. In contrast, referring to FIG. 2C, an increased delay of each of the paths (path a to path c) during a change from the first PVT corner PVT1 to the second PVT corner PVT2 may be identified through the PSA, which may indicate that the delay of the third path (path c) is greater than the delay for the first path (path a) or the second path (path b). Accordingly, it may be expected that the third path (path c) becomes a sensitivity critical path under the PVT condition at the third PVT corner PVT3 of FIG. 2A.

As shown above, the PSA may detect a sensitivity critical path that is not detected by the STA, and thus a chip capable of performing a stable operation under a wide range of PVT conditions may be fabricated taking into account this sensitivity critical path.

Figure 3:
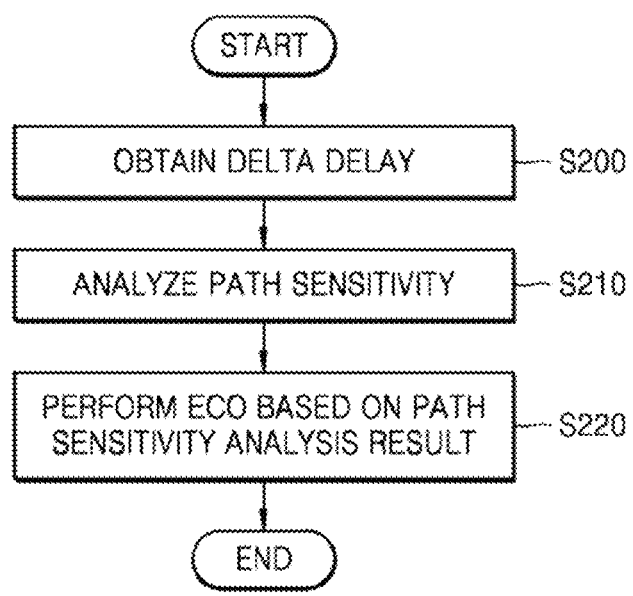
FIG. 3 is a flowchart of the PSA according to an embodiment of the present disclosure.

FIG. 3 is a flowchart of the PSA according to an embodiment of the present disclosure.

Referring to FIG. 3, a delta delay according to a PVT corner change with respect to paths in an integrated circuit of a chip design may be obtained (S200). In an embodiment, delta cell delays and delta net delays according to the PVT corner change may be obtained for a plurality of cells and a plurality of nets forming the integrated circuit. For example, design data may include a library indicating a delay change amount of each of the cells and the nets during the change from the first PVT corner to the second PVT corner, and the delta cell delays and the delta net delays may be obtained by reading the design data.

In another example, the design data may include a library indicating first delays of each of the cells and the nets at the first PVT corner and second delays of each of the cells and the nets at the second PVT corner, and the delta cell delays and the delta net delays may be obtained by reading the first delays and the second delays from the design data and calculating a difference between the first delays and second delays.

However, this process for obtaining the delta delay constitutes one embodiment, and the present disclosure is not limited thereto. For example, the delta delay may also be obtained by using information about a netlist, parasitics, or a library included in the design data, or by using a result of the STA. Furthermore, the delta cell delays and the delta net delays may be obtained by using the result of the STA (for example, from data used to obtain a hold slack and a setup slack or a result value of the hold slack and the setup slack). Thus, the above-described embodiment of obtaining the delta delays is an example, and the present disclosure is not limited thereto and the delta delays may be obtained using various other methods.

In one example, at least two PVT corners may be selected for the PSA, and at least one of the selected PVT corners may be the corner in which an operating voltage applied to the integrated circuit is the lowest, or the corner in which the temperature of the integrated circuit is the highest. Furthermore, in an embodiment, the PVT corner change when the PSA is performed may be in a direction in which the operating voltage applied to the integrated circuit decreases or the temperature of the integrated circuit increases.

Following step S200, path sensitivity may be analyzed based on a delta delay according to the PVT corner change with respect to paths in the integrated circuit of the chip design (S210). In an embodiment, sensitivity with respect to the delay according to the PVT corner change of paths in the integrated circuit may be analyzed by using delta cell delays of cells of the integrated circuit and delta net delays of nets of the integrated circuit.

Equations for the PSA according to an embodiment are shown below in Equations 1 and 2:

$$HS_{sense} = \sum_{data\ path\ early} \Delta d(PVT1 \to PVT2) - \sum_{clock\ path\ late} \Delta d(PVT1 \to PVT2), \quad (1)$$

$$SS_{sense} = \sum_{clock\ path\ early} \Delta d(PVT1 \to PVT2) - \sum_{data\ path\ late} \Delta d(PVT1 \to PVT2), \quad (2)$$

Where $HS_{sense}$ refers to a hold sensitivity slack, $SS_{sense}$ refers to a setup sensitivity slack, and $\Delta d$ refers to the delta delay of two PVT corners. In the above equations, it is assumed that the $HS_{sense}$ and the $SS_{sense}$ are obtained during the change from the first PVT corner PVT1 to the second PVT corner PVT2.

Thus, $HS_{sense}$ may be obtained by deducting a sum value of the slowest delta cell delays and the slowest delta net delays in a clock path corresponding to the data path from a sum value of the fastest delta cell delays and the fastest delta net delays in the data path. When the $HS_{sense}$ is greater than 0, the hold slack increases with the change from the first PVT corner PVT1 to the second PVT corner PVT2, which may signify an improvement of the hold characteristics. When the $HS_{sense}$ is less than 0, the hold slack decreases according to the change from the first PVT corner PVT1 to the second PVT corner PVT2, which may signify a deterioration of the hold characteristics. Paths in which the $HS_{sense}$ is less than 0 may be detected through the PSA. In particular, the extremal hold sensitivity slack path having the $HS_{sense}$ exceeding a threshold may be expected to commit a hold violation (a case in which the hold slack is less than 0) later at another PVT corner (for example, the third PVT corner of FIG. 2A), and thus may be determined to be a sensitivity critical path.

The setup sensitivity slack $SS_{sense}$ may be obtained by deducting a sum value of the slowest delta cell delays and the slowest delta net delays in the data path corresponding to the clock path from a sum value of the fastest delta cell delays and the fastest delta net delays in the clock path. When the $SS_{sense}$ is greater than 0, the setup slack according to the change from the first PVT corner PVT1 to the second PVT corner PVT2 increases, which may signify an improvement of setup characteristics. When the $SS_{sense}$ is less than 0, the setup slack decreases with the change from the first PVT corner PVT1 to the second PVT corner PVT2, which may signify deterioration of the setup characteristics. Paths in which the $SS_{sense}$ is less than 0 may be detected through the PSA.

In particular, the extremal setup sensitivity slack path having the $SS_{sense}$ exceeding a threshold may be expected to commit a setup violation (a case in which the setup slack is less than 0) later at another PVT corner (for example, the third PVT corner of FIG. 2A), and thus may be determined to be a sensitivity critical path.

Furthermore, a plurality of paths in the integrated circuit may have different periods. A normalized setup sensitivity slack $NSS_{sense}$ may be defined to compare relative performance increase and decrease with respect to paths having different periods may be obtained for each performance path (see Equation 3, below).

$$NSS_{sense} = \frac{SS_{sense}}{period} \quad (3)$$

Finally, engineering change order (ECO) may be performed based on a result of the path sensitivity analysis (S220). In detail, by performing the ECO, at least one of the data path corresponding to the sensitivity critical path determined in the path sensitivity analysis S210 and the clock paths corresponding thereto, may be corrected. For example, the ECO may indicate a size adjustment to the previous cell and net and/or insertion of a new cell or net. Accordingly, the $HS_{sense}$ and the $SS_{sense}$ may be improved.

Figure 4:
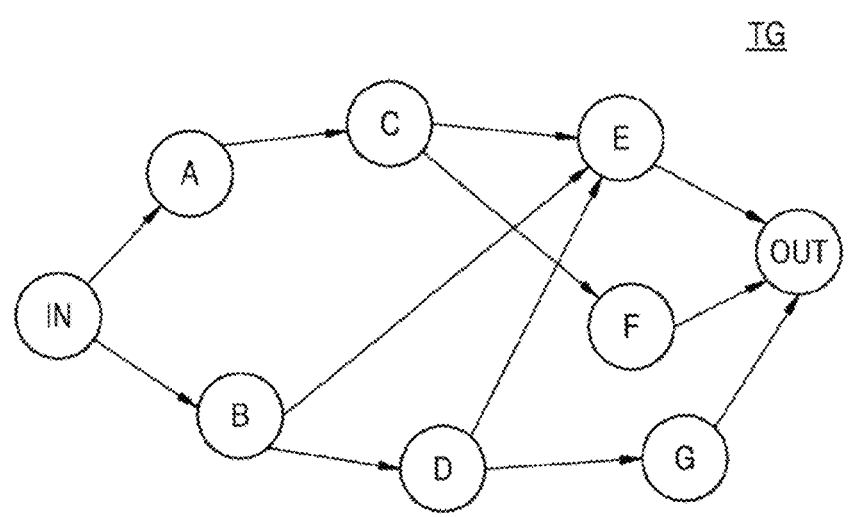
FIG. 4 is a timing graph showing paths in an integrated circuit of a chip design using nodes according to an embodiment of the present disclosure.

FIG. 4 is a timing graph showing paths in an integrated circuit of a chip design using nodes according to an embodiment of the present disclosure.

Referring to FIG. 4, in a timing graph TG which starts from an input node IN and ends at an output node OUT via connections between a plurality of nodes A to G, a plurality of paths may be formed between the input node IN and the output node OUT. A node may be a concept including a cell and/or a net. An integrated circuit may include a plurality of paths, and the PSA may be performed with respect to all paths of the integrated circuit. However, this is an example embodiment, and the present disclosure is not limited thereto. When the STA is performed with the PSA, the PSA may be performed only on sonic of the paths based on a result of the STA. For example, the PSA may be performed on paths other than the paths corrected according to the result of the STA.

Figure 5:
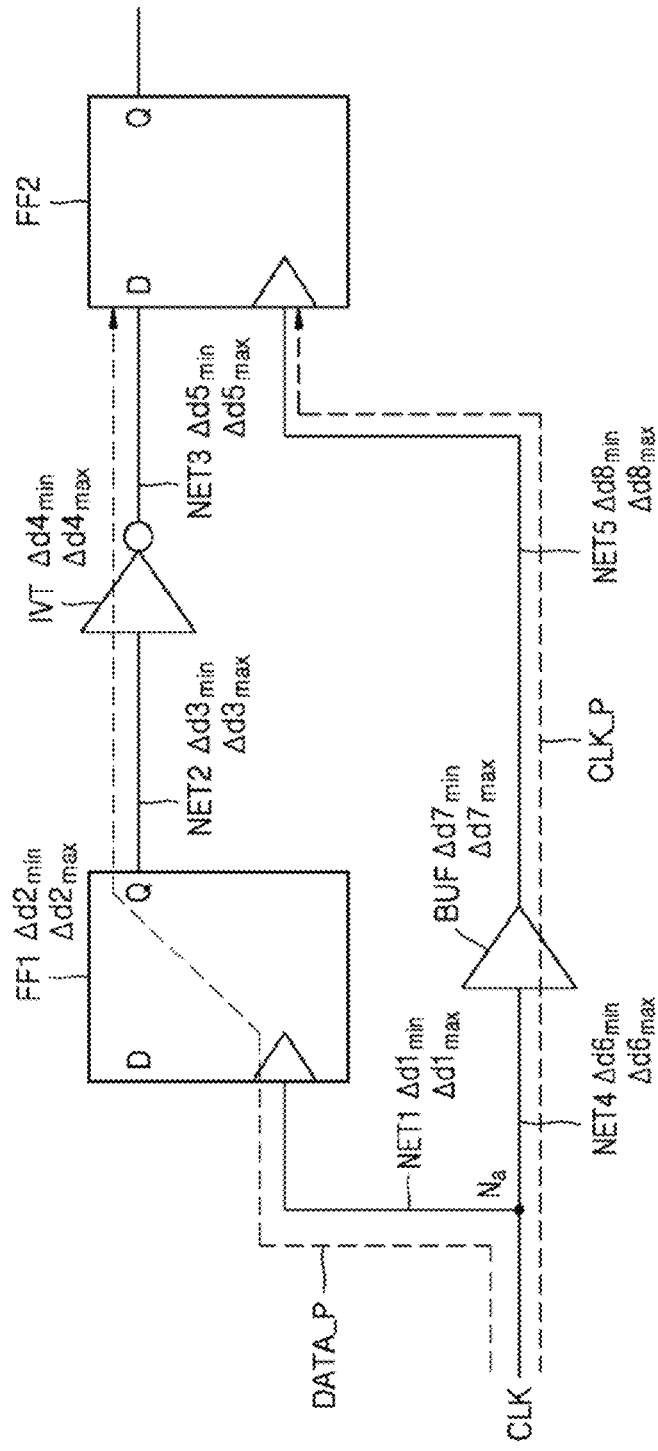
FIG. 5 is a circuit diagram for describing in detail a method of obtaining hold sensitivity slack and setup sensitivity slack in the PSA, according to an embodiment the present disclosure.

FIG. 5 is a circuit diagram for describing in detail a method of obtaining hold sensitivity slack and setup sensitivity slack in the PSA, according to an embodiment of the present disclosure. In the following description, it is assumed that the PSA is performed during a change from the first PVT corner to the second PVT corner. Furthermore, a delta delay may be defined to be a delay change amount according as a certain cell or net is changed from the first PVT corner to the second PVT corner.

FIG. 5 illustrates a data path DATA_P in the timing graph TG of FIG. 4 and a clock path CLK_P corresponding thereto. Referring to FIG. 5, the data path DATA_P may include first to third nets NET1 to NET3, a first flip-flop FF1, and an inverter IVT, and the clock path CLK_P may include fourth and fifth nets NET4 and NET5 and a buffer BUF. The first and second flip-flops FF1 and FF2, the inverter IVT, and the buffer BUF may correspond to cells.

First, the hold sensitivity slack may be obtained by deducting a sum value of the slowest delta cell delay $\Delta d7$ max and the slowest delta net delays $\Delta d6$ max and $\Delta d8$ max of the clock path CLK_P from a sum value of the fastest delta cell delays $\Delta d2$ min and $\Delta d4$ min and the fastest delta net delays $\Delta d1$ min, $\Delta d3$ min, and $\Delta d5$ min of the data path DATA_P.

The setup sensitivity slack may be obtained by deducting a sum value of the slowest delta cell delays $\Delta d2$ max and $\Delta d4$ max and the slowest delta net delays $\Delta d1$ max, $\Delta d3$ max, and $\Delta d5$ max of the data path DATA_P from a sum value of the fastest delta cell delay $\Delta d7$ min and the fastest delta net delays $\Delta d6$ min and $\Delta d8$ min of the clock path CLK_P.

The PSA may be performed by obtaining the hold sensitivity slack and the setup sensitivity slack on the paths of the timing graph TO of FIG. 4 by using the method described in FIG. 5.

FIG. 6 is a flowchart for explaining in detail the operation S210 of FIG. 3 according to an embodiment of the present disclosure.

Referring to FIG. 6, after the operation S200 (see FIG. 4), a slack change amount with respect to the paths in the integrated circuit may be calculated by using the delta cell delays and the delta net delays (S212). The slack change amount is an index indicating sensitivity of each path and may be referred to as the sensitivity slack, and the slack change amount may include at least one of the hold sensitivity slack and the setup sensitivity slack, N-number of paths, where N is an integer greater than or equal to 0, of a plurality of paths may be determined to be sensitivity critical paths based on the slack change amount (S214). In an embodiment, paths in which the hold sensitivity slack and/or the setup sensitivity slack have a negative value may be detected, and N-number of extremal paths, where N is an integer greater than or equal to 0, in which the hold sensitivity slack and/or the setup sensitivity slack exceed a threshold, among the detected paths may be determined to be sensitivity critical paths. Then, a subsequent operation 220 may be performed.

FIG. 7 is a table Table_a showing an example of a result obtained when the STA and the PSA are performed on a plurality of paths. In the following description, a clock path corresponding to each of data paths DATA_P1 to DATA_P4 is omitted, and data paths are mainly described according to an embodiment of the present disclosure.

Referring to FIG. 7, when the STA and the PSA are performed on the first to fourth data paths DATA_P1 to DATA_P4, results of the analyses may be summarized as shown in the table Table_a. The first data path DATA_P1 may pass the STA (PASS), but may be determined to be a sensitivity critical path (SCP) in the PSA. The second data path DATA_P2 may be determined to be a timing critical path (TCP) in the STA, but may pass the PSA (PASS). The third data path DATA_P3 may pass both the STA and the PSA (PASS). Furthermore, the fourth data path DATA_P4 may be determined to be a TCP in the STA and an SCP in the PSA.

As such, the operation 220 of FIG. 3 may be performed based on the results of the STA and the PSA. Accordingly, a chip design which enables normal operation under a wide range of PVT conditions may be determined.

Figure 8A:
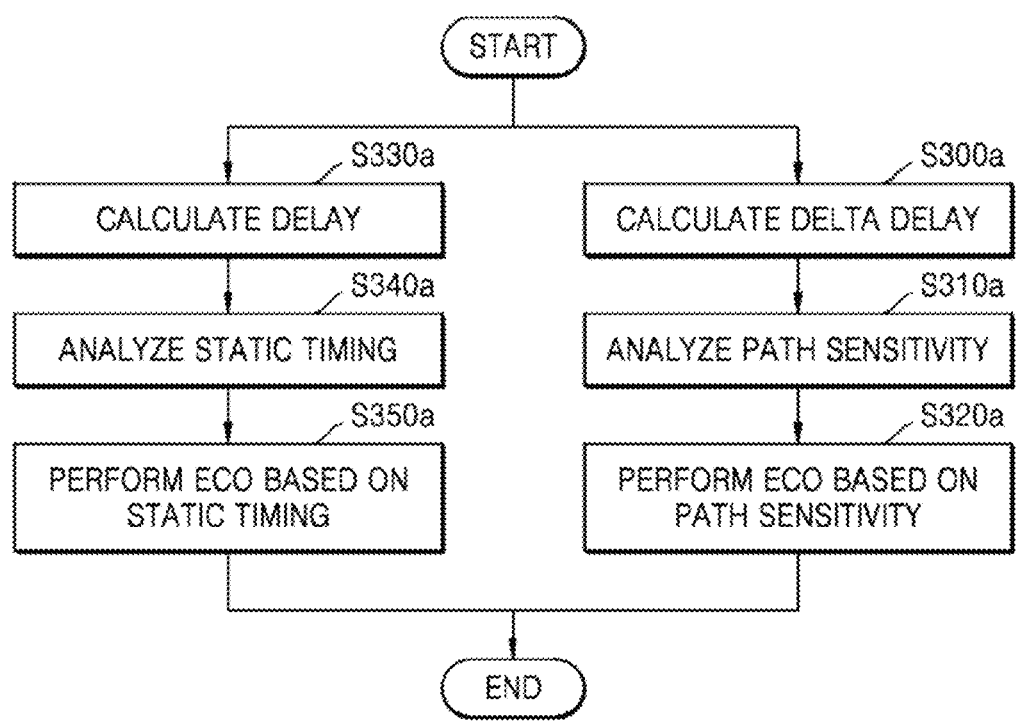
FIGS. 8A to 8C are flowcharts for explaining methods of performing an STA and a PSA, according to embodiments of the present disclosure.
Figure 8B:
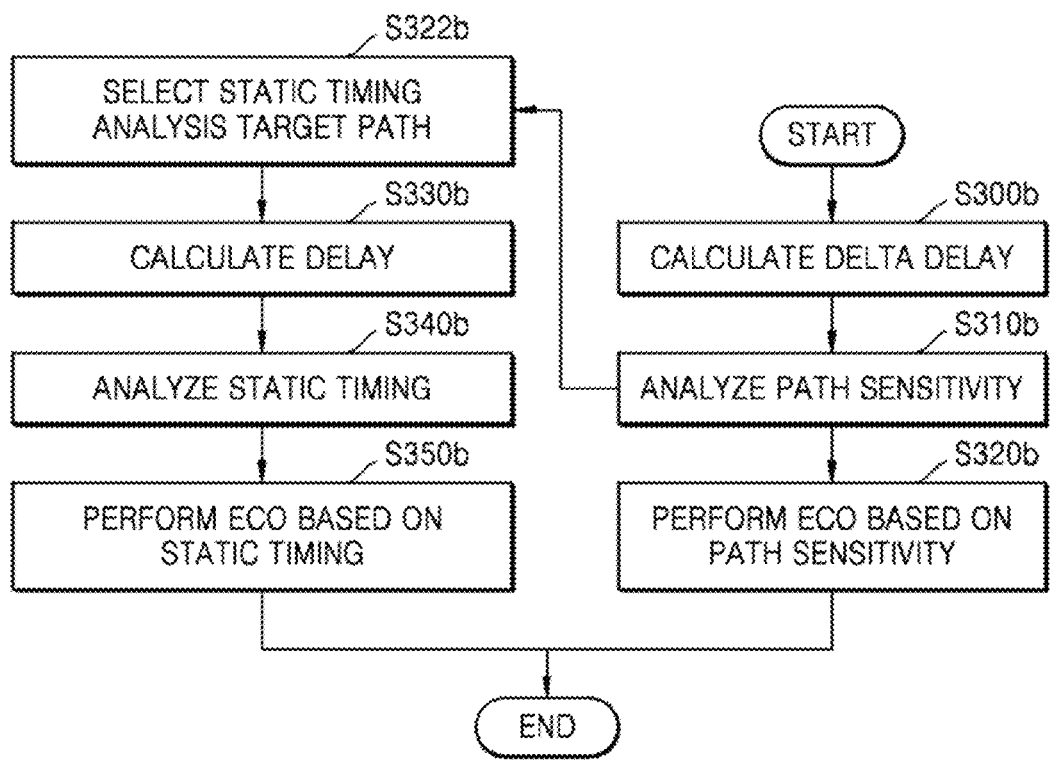
Figure 8C:
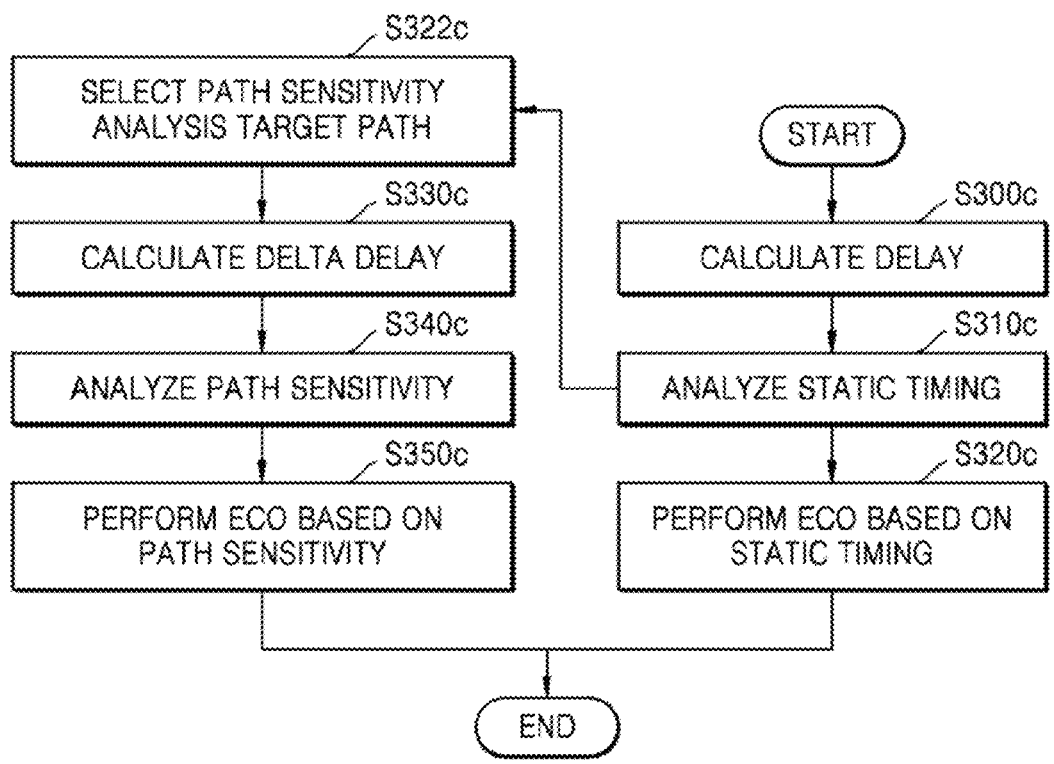

FIGS. 8A to 8C are flowcharts for explaining methods of performing an STA and a PSA, according to an embodiment of the present disclosure.

Referring to FIG. 8A, according to an embodiment, the PSA and the STA may be performed in parallel. In detail, a delta delay of a plurality of paths in an integrated circuit is calculated (S300a), path sensitivity of paths is analyzed by using the delta delay (S310a), and EGO is performed based on the path sensitivity (S320a). Simultaneously and in parallel, a delay of a plurality of paths in the integrated circuit is calculated (S330a), static timing of paths is analyzed by using the delay (S340a), and ECO is performed based on the static timing (S350a).

Referring to FIG. 8B, according to an embodiment, the STA may be performed by using a result of the PSA. In detail, a delta delay of a plurality of paths in an integrated circuit is calculated (S300b), path sensitivity of paths are analyzed by using the delta delay (S310b), and EGO is performed based on the path sensitivity (S320b), thereby performing the PSA. Furthermore, a static timing analysis target path may be selected by using a result of the path sensitivity analysis S310b (S322b). For example, paths other than the paths determined to be sensitivity critical paths in the path sensitivity analysis S310b may be selected as static timing analysis target paths. However, this is exemplary, and a variety of methods of selecting static timing analysis target paths by using the result of the path sensitivity analysis S310b may be employed. Then, the STA may be performed by performing operations S330b to S350b.

Referring to FIG. 8C, according to an embodiment, the PSA may be performed by using a result of the STA. In detail, a delay of a plurality of paths in an integrated circuit is calculated (S300c), static timing of paths are analyzed by using the delay (S310c), and ECO is performed based on the static timing (S320c), thereby performing the STA. Furthermore, a path sensitivity analysis target paths is selected by using a result of the static timing analysis S310c (S322c). For example, paths other than the paths determined to be timing critical paths in the static timing analysis S310c may be selected as path sensitivity analysis target paths. However, this is exemplary, a variety of methods of selecting path sensitivity analysis target paths by using the result of the static timing analysis S310c may be employed. Then, the PSA may be completed by performing operation S330c to S350c.

Furthermore, since the hold slack change amount and the setup slack change amount according to the change in the PVT corner is directly calculated by using the hold slack and the setup slack calculated through the static timing analysis S310c, the above-described hold sensitivity slack and setup sensitivity slack may be obtained. The operation S330c may be omitted as occasion demands.

Figure 9A:
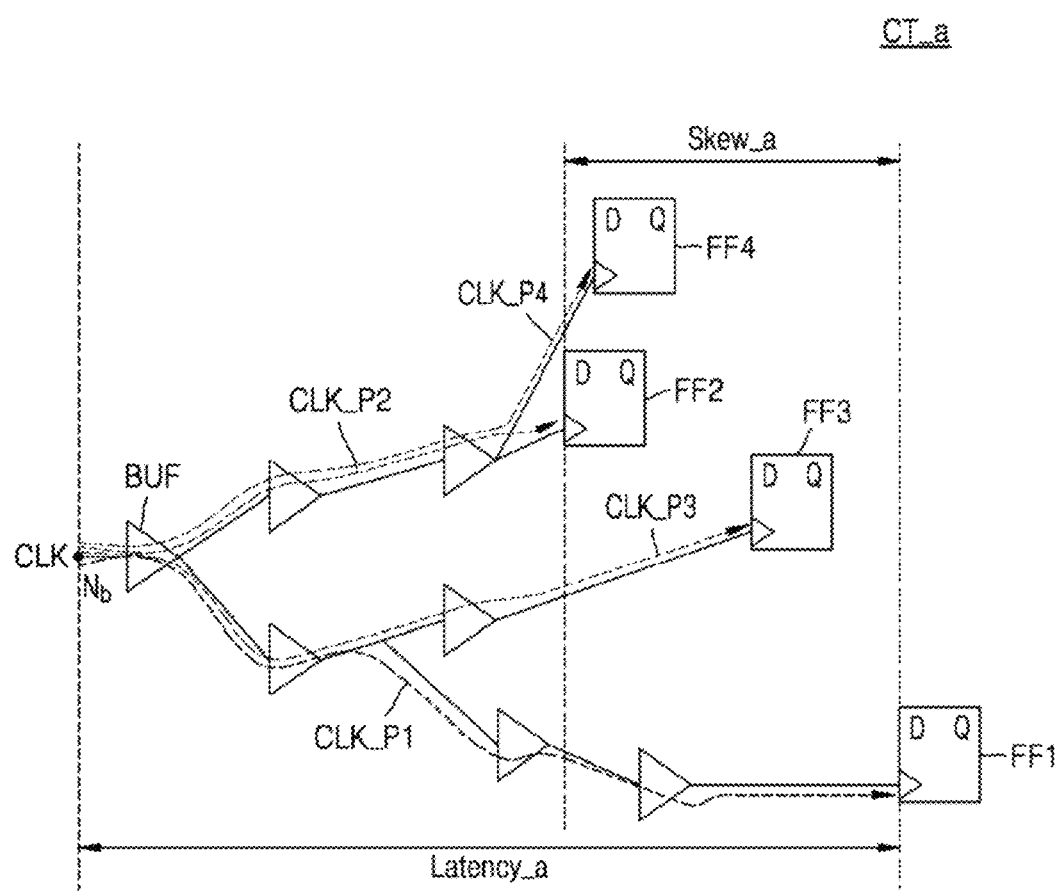
FIGS. 9A and 9B illustrate a PSA on a clock tree, according to an embodiment according to an embodiment of the present disclosure.
Figure 9B:
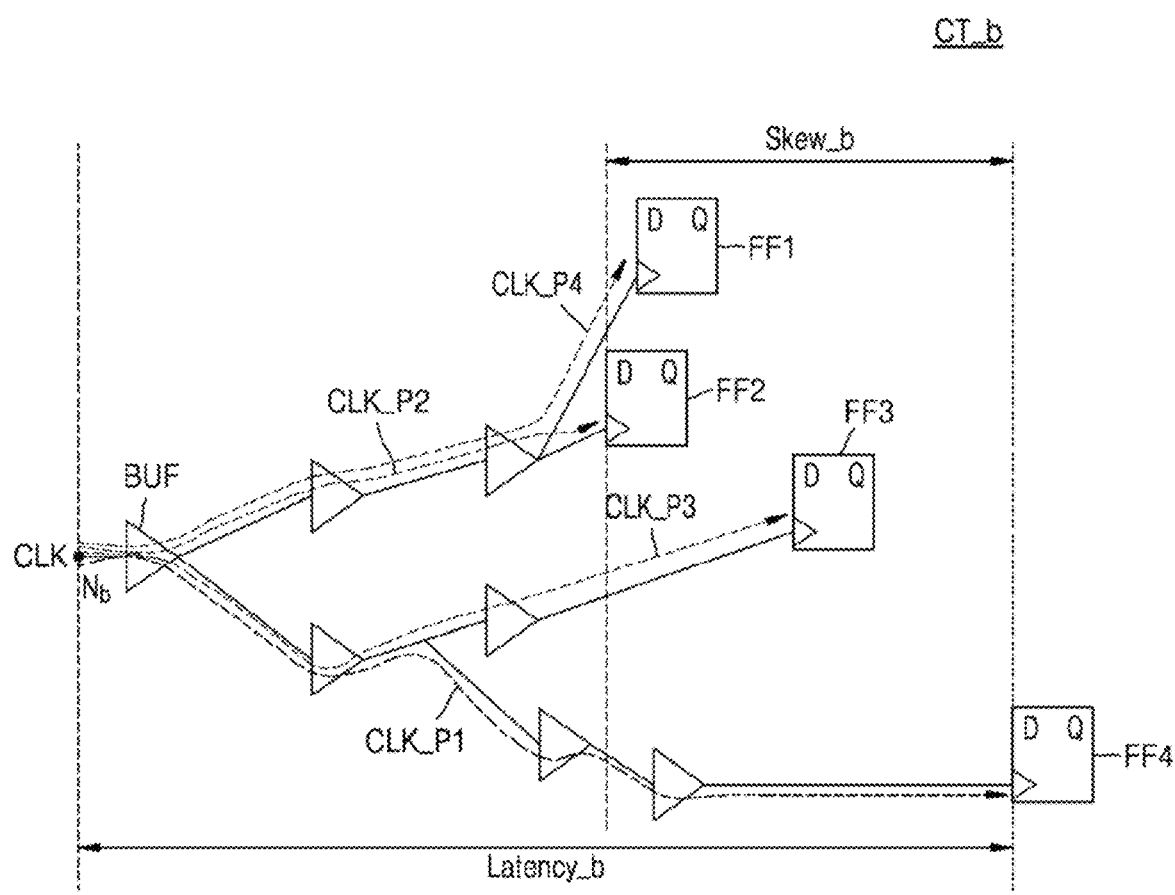

FIGS. 9A and 9B illustrate a PSA on a clock tree, according to an embodiment of the present disclosure. In the following description, a chip design may include a plurality of integrated circuits, and each of the integrated circuits may include one or more clock trees. FIGS. 9A and 9B illustrate a delay of a clock path starting from a node Nb where a clock signal starts and arriving at an internal node with respect to one clock tree CT_a or CT_b. FIG. 9A illustrates a delay generated at the first PVT corner, and FIG. 9B illustrates a delay generated at the second PVT corner. Referring to FIG. 9A, the clock tree CT_a may include a plurality of buffers BUF and a plurality of first to fourth flip-flops FF1 to FF4. The clock tree CT_a may include a plurality of first to fourth clock paths CLK_P1 to CLK_4, and a delay of the second to fourth clock paths CLK_P2 to CLK_4 from the node Nb Where the clock signal starts to each of the first to fourth flip-flops FF1 to FF4 may be defined to be a clock latency of the first to fourth flip-flops FF1 to FF4. For example, the clock latency of the first flip-flop FF1 may be a first clock latency Latency_a corresponding to a delay of a first clock path CLK_P1 to the first flip-flop FF1. Furthermore, the greatest delay difference between a delay of the clock path to a target flip-flop in the clock tree CT_a and delays of the other clock paths may be defined to be a clock skew of the target flip-flop.

For example, a clock skew of the first flip-flop FF1 may be a first clock skew Skew_a that is difference between a delay or clock latency of the first clock path CLK_P1 to the first flip-flop FF1 and a delay or clock latency of the second clock path CLK_P2 to the second flip-flop FF2. In the following description, the clock latency of a target flip-flop may be referred to as a clock latency with respect to a target clock path corresponding to the target flip-flop, and the clock skew of a target flip-flop may be referred to as a clock skew with respect to the target dock path corresponding to the target flip-flop.

Referring to FIG. 9B, the clock tree CT_b may include a plurality of first to fourth clock paths CLK_P1 to CLK_P4 in which a delay is changed according to a PVT corner change. In other words, a delay of the first to fourth clock paths CLK_P1 to CLK_4 of the clock tree CLK_b of FIG. 9B may be greater than the delay of the first to fourth clock paths CLK_P1 to CLK_4 of the clock tree CT_a of FIG. 9A. In FIG. 9B, like FIG. 9A, the delay of the first clock path CLK_P1 may correspond to a clock latency Latency_b, and a delay difference between the first clock path CLK_P1 and the second clock path CLK_P2 may correspond to a clock skew Skew_b.

The PSA on a clock tree according to an embodiment may calculate a clock latency change amount of each of the first to fourth flip-flops FF1 to FF4, for example, a value obtained by deducting the clock latency of the first flip-flop FF1 (latency_a) of FIG. 9A from the clock latency of the first flip-flop FF1 (latency_b) of FIG. 9B, and a clock skew change amount of each of the first to fourth flip-flops FF1 to FF4, for example, a value obtained by deducting the clock skew of the first flip-flop FF1 (skew_a) of FIG. 9A from the clock skew of the first flip-flop FF1. (skew_b) of FIG. 9B, according to the PVT corner change, respectively as clock latency sensitivity and clock skew sensitivity. In the following description, the clock latency sensitivity of a target flip-flop may be referred to as the clock latency sensitivity of a clock path corresponding to the target flip-flop, and the clock skew sensitivity of a target flip-flop may be referred to as the clock skew sensitivity of a clock path corresponding to the target flip-flop.

For example, when the clock latency change amount of the first flip-flop FF1 (or, clock latency sensitivity) exceeds a threshold, it is expected that a data path connected to the first clock path CLK_P1 at another PVT corner, for example, the third PVT corner of FIG. 2A) may commit a hold violation or a setup violation later. Accordingly, a correction of the first clock path CLK_P1 may be needed.

A sensitivity critical clock path may be determined by using the clock latency sensitivity and the clock skew sensitivity, and ECO may be performed on the sensitivity critical clock path. In the same method, the PSA may be performed on each of the clock tree.

Figures 10, 11:
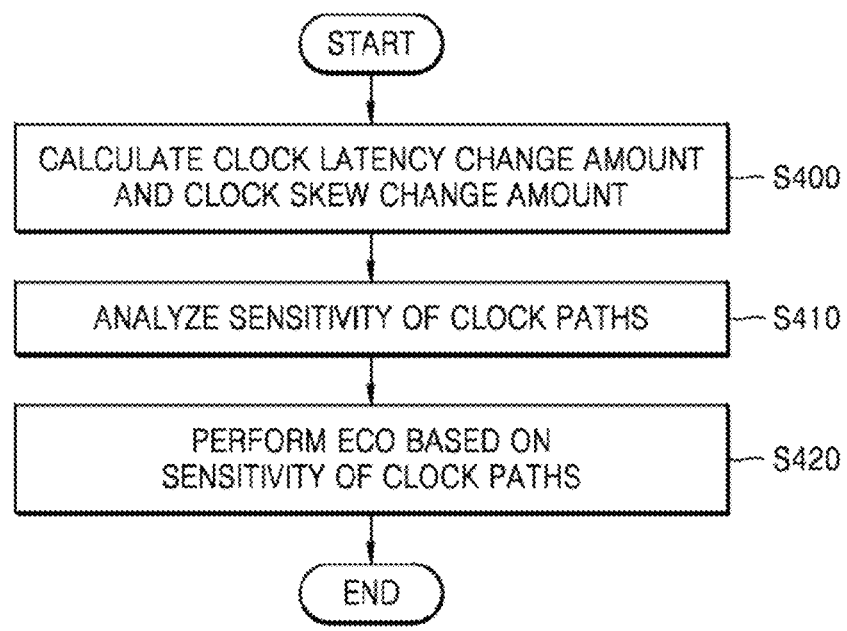
FIG. 10 is a flowchart for explaining a PSA on a clock tree, according to an embodiment of the present disclosure.
FIG. 11 is a table showing an example of a result obtained when a PSA is performed on a clock tree of each of a plurality of integrated circuits according to an embodiment of the present disclosure.

FIG. 10 is a flowchart for explaining a PSA on a clock tree, according to an embodiment according to an embodiment of the present disclosure.

Referring to FIG. 10, a clock latency change amount and a clock skew change amount according to the PVT corner change with respect to a plurality of clock paths of a clock tree in the integrated circuit may be calculated (S400).

The sensitivity of a plurality of clock paths may be analyzed by determining the clock latency change amount and the clock skew change amount to be the clock latency sensitivity and the clock skew sensitivity, respectively (S410). Then, ECO may be performed on a clock tree based on the sensitivity of clock paths (S420). The PSA and the ECO may be performed in an operation after the operation of generating clock paths, furthermore in an operation before all data paths are generated.

FIG. 11 is a table showing an example of a result obtained when a PSA is performed on a clock tree of each of a plurality of integrated circuits according to an embodiment of the present disclosure.

Referring to FIG. 11, any one clock tree in a chip design may include the first to fourth clock paths CLK_P1 to CLK_P4, and when the PSA is performed on the first to fourth clock paths CLK_P1 to CLK_P4, a result of analysis may be summarized as shown in a table Table_b. The first to fourth clock paths CLK_P1 to CLK_P4 may respectively have certain values L1 to L4 as clock latency sensitivity, and certain values S1 to S4 as clock skew sensitivity.

Figure 12:
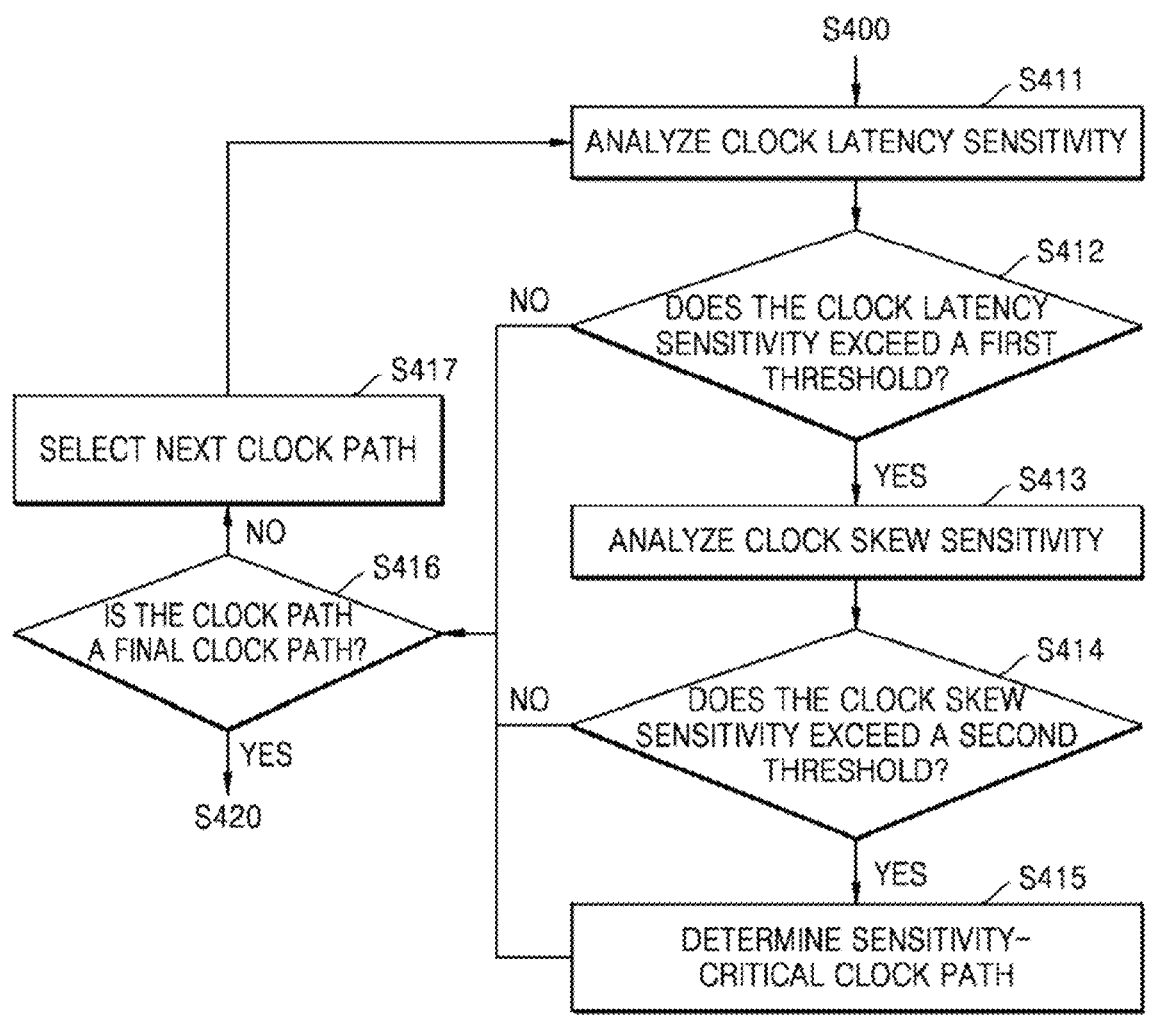
FIG. 12 is a flowchart for explaining in detail an operation S410 of FIG. 10 according to an embodiment of the present disclosure.

FIG. 12 is a flowchart for explaining in detail the operation S410 of FIG. 10 according to an embodiment of the present disclosure.

Referring to FIG. 12, after the operation S400 of FIG. 10, the clock latency sensitivity of a target clock path of the clock paths included in a clock tree in the integrated circuit may be analyzed (S411). Next, whether the clock latency sensitivity exceeds a first threshold may be determined (S412). When the clock latency sensitivity exceeds the first threshold (S412, YES), the clock skew sensitivity of the target clock path may be analyzed (S413). When the clock skew sensitivity exceeds a second threshold (S414, YES), the target clock path may be determined to be a sensitivity critical clock path (S415). When the clock latency sensitivity does not exceed the first threshold (S412, NO), the clock skew sensitivity does not exceed the second threshold (S414, NO), or after the operation S415, whether a clock path that becomes a target of the PSA is final may be determined (S416). When the clock path is not a final clock path (S416, NO), a next clock path is selected as the target clock path (S417), and thus the operation S411 may be performed. When the clock path is a final clock path (S416, YES), the operation S420 of FIG. 10 may be performed.

Figure 13:
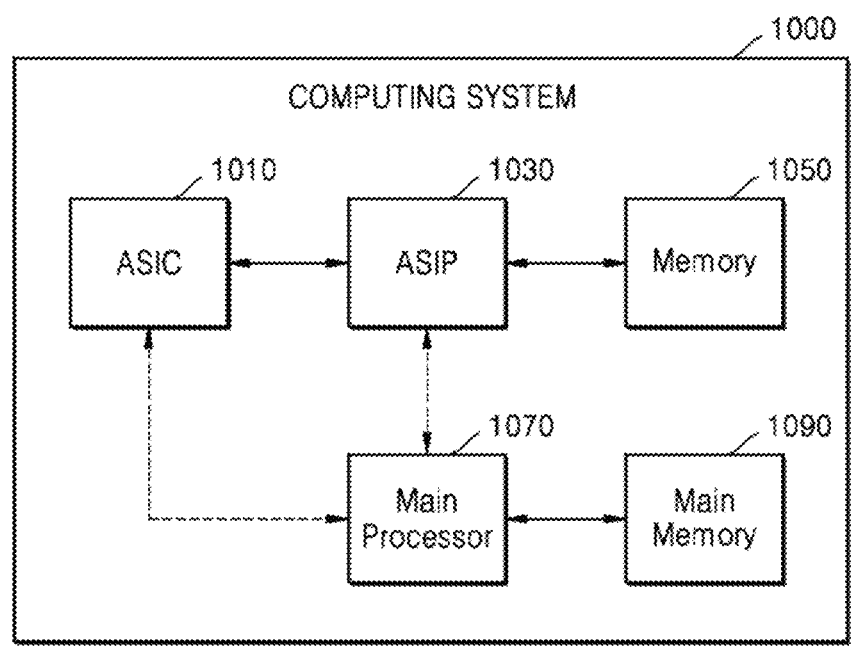
FIG. 13 is a block diagram of a computing system according to an embodiment of the present disclosure.

FIG. 13 is a block diagram of a computing system 1000 according to an embodiment of the present disclosure.

Referring to FIG. 13, the computing system 1000 may include an application specific integrated circuit (ASIC) 1010, an application specific instruction set processor (ASIP) 1030, a memory 1050, a main processor 1070, and a main memory 1090. At least two of the ASIC 1010, the ASIP 1030, and the main processor 1070 may communicate with each other. Furthermore, at least two of the ASIC 1010, the ASIC 1030, the memory 1050, the main processor 1070, and the main memory 1090 may be included in a single chip.

The ASIP 1030 is an integrated circuit that is customized for a special purpose, and may support an exclusive instruction set for a specific application and execute an instruction included in the instruction set. The memory 1050 may communicate with the ASIP 1030, store, as a non-transitory storing device, a plurality of instructions to be executed by the ASIP 1030. The memory 1050 may include a certain tangible memory that is accessible by the ASIP 1030, for example, random access memory (RAM), read only memory (ROM), a tape, a magnetic disk, an optical disk, a volatile memory, a non-volatile memory, and a combination thereof. The ASIP 1030 or the main processor 1070 may perform the PSA as described in FIG. 1, by performing a series of instructions stored in the memory 1050.

The main processor 1070 may control the computing system 1000 by executing a plurality of instructions. For example, the main processor 1070 may control the ASIC 1010 and the ASIP 1030, or process data received through a wireless communication network or a user input to the computing system 1000. The main memory 1090 may communicate with the main processor 1070, and store, as a non-transitory storing device, a plurality of instructions for the PSA according to the above-described embodiments, which is executed by the main processor 1070. Furthermore, the main memory 1090 may store design data to be read to obtain a delta cell delay or a delta net delay.

While the inventive concept has been particularly shown and described with reference to embodiments thereof, it will be understood that various changes in form and details may be made therein without departing from the spirit and scope of the following claims.

What is claimed is:

1. A method of designing a chip having an integrated circuit, the method comprising:
   obtaining delta cell delays and delta net delays according to a process, voltage, and temperature (PVT) corner change with respect to a plurality of cells and a plurality of nets forming the integrated circuit, wherein each of the delta cell delays and the delta net delays comprises a delay change amount based on the PVT corner change;
   analyzing sensitivity of a delay with respect to the PVT corner change for a plurality of paths in the integrated circuit, by using the delta cell delays and the delta net delays;
   determining N-number of sensitivity critical paths among the plurality of paths based on a result of the analysis, wherein N is an integer greater than or equal to 0; and
   performing an engineering change order (ECO) based on a result of the determination.

2. The method of claim 1, wherein the obtaining of the delta cell delays and the delta net delays further comprises obtaining the delta cell delays and the delta net delays by reading design data including a library indicating the delay change amount of each of the plurality of cells and the plurality of nets during a change from a first PVT corner to a second PVT corner.

3. The method of claim 1, wherein the obtaining of the delta cell delays and the delta net delays comprises:
reading design data including a library indicating first delays of each of the plurality of cells and the plurality of nets at a first PVT corner and second delays indicating second delays of each of the plurality of the cells and the plurality of nets at a second PVT corner; and
obtaining the delta cell delays and the delta net delays by using a difference between the first delays and the second delays.

4. The method of claim 1, wherein the obtaining of the delta cell delays and the delta net delays comprises obtaining the delta cell delays and the delta net delays by using a result of static timing analysis of the plurality of paths in the integrated circuit performed at a first PVT corner and a result of static timing analysis of the plurality of paths in the integrated circuit performed at a second PVT corner.

5. The method of claim 1, wherein the analyzing of the sensitivity comprises calculating, as the sensitivity, a slack change amount according to the PVT corner change between the plurality of paths and clock paths respectively corresponding to the plurality of paths by using the delta cell delays and the delta net delays.

6. The method of claim 5, wherein the slack change amount comprises at least one of a hold slack change amount and a setup slack change amount.

7. The method of claim 5, wherein the determining of the N-number of sensitivity-critical paths comprises:
comparing the slack change amount with a certain threshold; and
determining, from among the plurality of paths, any path having the slack change amount exceeding the threshold to be a sensitivity-critical path.

8. The method of claim 1, wherein the PVT corner change is in a direction in which an operating voltage applied to the integrated circuit decreases, and
each of the N-number of sensitivity-critical paths is a path that is expected to violate a timing constraint at a PVT corner having a certain operating voltage.

9. The method of claim 1, wherein the PVT corner change is in a direction in which a temperature of the integrated circuit increases, and
each of the N-number of sensitivity-critical paths is a path that is expected to violate a timing constraint at a PVT corner having a certain temperature.

10. A method of designing a chip having an integrated circuit, the method comprising:
obtaining delta cell delays and delta net delays according to a process, voltage, and temperature (PVT) corner change with respect to a plurality of cells and a plurality of nets forming the integrated circuit;
performing analysis on a clock latency sensitivity and a clock skew sensitivity according to the PVT corner change of a plurality of clock paths included in a clock tree in the integrated circuit, by using the delta cell delays and the delta net delays;
determining a sensitivity-critical clock path among the plurality of clock paths based on a result of the analysis; and
performing an engineering change order (ECO) on the clock tree based on the result of the determination.

11. The method of claim 10, wherein the performing of the analysis on the clock latency sensitivity and the clock skew sensitivity comprises calculating a delay difference between a target clock path of the plurality of clock paths at a first PVT corner and the target clock path at a second PVT corner as the clock latency sensitivity of the target clock path.

12. The method of claim 10, wherein the performing of the analysis on the clock latency sensitivity and the clock skew sensitivity comprises:
calculating a first clock skew that is a greatest delay difference among delay differences between a target clock path and other clock paths among the plurality of clock paths at a first PVT corner, and a second clock skew that is a greatest delay difference among delay differences between the target clock path and the other clock paths at a second PVT corner; and
determining a difference between the first clock skew and the second clock skew to be the clock skew sensitivity of the target clock path.

13. The method of claim 10, wherein the performing of the analysis on the clock latency sensitivity and the clock skew sensitivity comprises:
comparing the clock latency sensitivity with a threshold; and
when the clock latency sensitivity exceeds the threshold, analyzing the clock skew sensitivity.

14. The method of claim 10, wherein the determining of the sensitivity-critical clock path comprises:
comparing the clock skew sensitivity with a threshold; and
when the clock skew sensitivity exceeds the threshold, determining a target clock path corresponding to the clock skew sensitivity to be the sensitivity-critical clock path.

* * * * *